Sept. 9, 1969    E. C. BRUNS    3,465,630
GAP CLOSER FOR MATERIAL CUTTING MACHINE
Filed May 8, 1967    2 Sheets-Sheet 1

INVENTOR.
EDWARD C. BRUNS
BY Frank C. Leach Jr.
HIS ATTORNEY

Sept. 9, 1969 E. C. BRUNS 3,465,630
GAP CLOSER FOR MATERIAL CUTTING MACHINE
Filed May 8, 1967 2 Sheets-Sheet 2

United States Patent Office 3,465,630
Patented Sept. 9, 1969

3,465,630
GAP CLOSER FOR MATERIAL CUTTING
MACHINE
Edward C. Burns, Cincinnati, Ohio, assignor to The
Cincinnati Milling Machine Co., Cincinnati, Ohio,
a corporation of Ohio
Filed May 8, 1967, Ser. No. 636,964
Int. Cl. B26d 7/06
U.S. Cl. 83—424                                              10 Claims

ABSTRACT OF THE DISCLOSURE

A closure structure for closing a transverse passage, which is formed between endless bands of a material cutting machine, to permit cutting means to move transverse of the material supported on the endless bands. The closure structure includes rotatable drums disposed on opposite sides of the endless bands. Each of the drums has one end of a separate spring tape attached thereto and biased towards the drum. The other end of each of the separate spring tapes is attached to support structure for the cutting means. As the cutting means is moved across the transverse passage by its support means, one of the spring tapes is wound upon its drum while the other is unwound from its drum so that the transverse passage remains closed.

In material cutting machines in which there is universal movement between the material and the cutting means in the plane of the material and the cutting means extends below the cutting plane, there must be some type of transverse passage in the material support means to permit relative transverse movement between the material and the cutting means.

In material cutting machines in which a pair of endless bands longitudinally moves the material, the transverse passage is provided between the adjacent ends of the endless bands whereby the cutting means may move transversely. One such structure is shown in the copending patent application of George W. Sederberg for "Material Cutting Machine Having Reciprocating Cutting Blade," Ser. No. 636,965, filed May 8, 1967, and assigned to the same assignee as the assignee of the present application.

In material cutting machines in which a single flexible band is employed as the support structure for the material with the cutting means being moved both transversely and longitudinally relative to the material, which is supported on the band and fixed against movement, a transverse passage is provided within the single band by depressing it whereby the cutting means may move transversely. One such structure is shown in U.S. Patent 3,262,348 to James G. Wiatt et al.

When the material being cut is cloth, for example, the passage of the leading edge of the material across the transverse gap in the material support means in the aforesaid Sederberg application may cause the material to be caught within the transverse passage. As a result, the desired pattern would not be cut in the material.

In the aforesaid Wiatt et al. patent, the end of the material might tend to fall into the transverse passage when the cutting blade is disposed adjacent one end of the material. This also would result in the desired cutting pattern not being formed in the material being cut.

The present invention satisfactorily overcomes the foregoing problem by providing a closure structure that substantially closes the transverse passage except for an opening therein through which the cutting means moves. With the closure structure of the present invention, there is no possibility of the material being caught in the transverse passage.

In the cutting machines of the aforesaid Sederberg application and the Wiatt et al. patent, there is the possibility that the material may sag slightly due to the transverse passage into which the cutting means extends. This may affect the cutting pattern formed in the material.

The present invention satisfactorily solves this problem since the closure structure provides support across the transverse passage for the entire width of the material supporting structure. Thus, there can be no sagging of the material when the closure structure of the present invention is employed.

In both the aforesaid Sederberg application and the aforesaid Wiatt et al. patent, throat way sections are employed to reduce the size of the transverse passage through which the cutting means moves. Since the support for these throat way sections is only at the opposite ends, the throat way sections have a tendency to sag or bow. This would prevent the material from being disposed in a substantially perpendicular plane to the cutting means whereby each of a plurality of layers of cloth, for example, may not have exactly the same cutting pattern formed therein.

The present invention satisfactorily overcomes this problem by utilizing a portion of the closure structure to maintain the material substantially perpendicular to the cutting means. This insures that the material has the desired pattern formed therein.

An object of this invention is to provide a device to prevent material being cut from entering a transverse passage in the material support means into which the cutting means extends.

Another object of this invention is to provide a device that maintains a substantially continuous support structure for the material.

A further object of this invention is to provide a device that insures that the material is disposed substantially perpendicular to the plane of the cutting means in the area of the material being cut by the cutting means.

Other objects of this invention will be readily perceived from the following description, claims, and drawings.

This invention relates to an improvement in a cutting machine, which has cutting means and means to support the cutting means. The cutting machine also has means to support material to be cut by the cutting means with a transverse passage in the material supporting means to receive the cutting means. The material supporting means and the cutting means are relatively movable in a longitudinal direction to move the material on the material supporting means relative to the cutting means in a longitudinal direction. The cutting means and the material supporting means are relatively movable in a transverse direction in coordination with the relative longitudinal movement whereby the cutting means moves within the transverse passage in the material supporting means to move the cutting means relative to the material in a transverse direction and in cutting engagement therewith. The improvement comprises means to substantially close the transverse passage in the material supporting means with the closing means having means to maintain an opening to receive the cutting means.

This invention also relates to a device for substantially closing a transverse gap in a material supporting means into which cutting means extends to cut material supported on the material supporting means. The device includes rotatable support means disposed adjacent each end of the transverse gap. One of the rotatable support means has one end of a first closing means attached thereto. The first closing means has a width sufficient to close the transverse gap and its other end adapted to be fixedly attached to support means for the cutting means to close the transverse gap between the one rotatable support means and the attachment of the first closing means to the support means for the cutting means. The first closing means is resiliently urged toward the one rotatable support means. The other of the rotatable support means has one end of a second closing means attached thereto. The second closing means also has a width sufficient to close the transverse gap and has its other end adapted to be fixedly attached to the support means for the cutting means opposite from the attachment of the first closing means to close the transverse gap between the other rotatable support means and the attachment of the second closing means to the support means for the cutting means. The second closing means is resiliently urged toward the other rotatable support means.

The attached drawings illustrate a preferred embodiment of the invention, in which.

Figure 1:
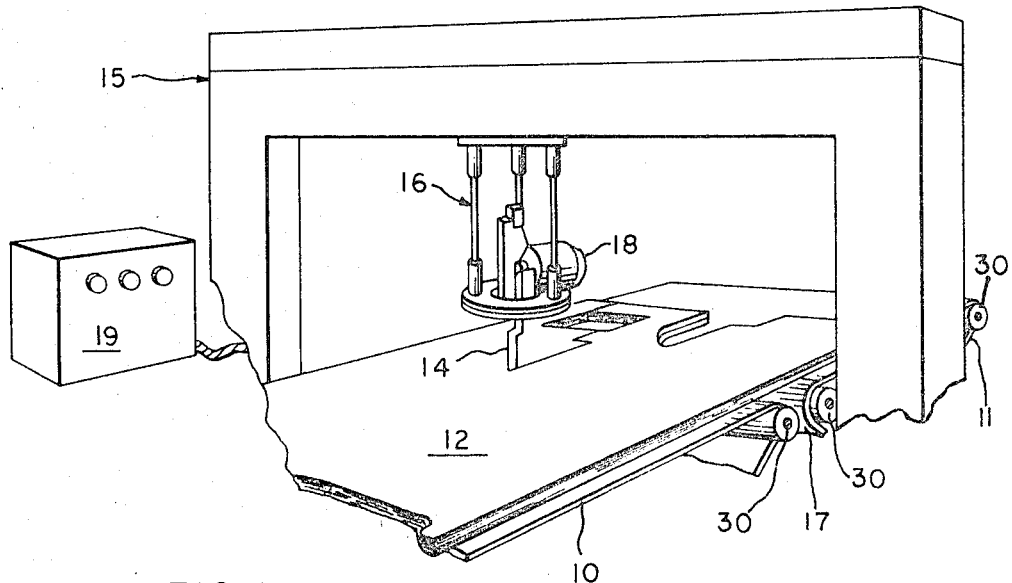
FIGURE 1 is a perspective view of a portion of a material cutting machine which would utilize the gap closer of the present invention with parts omitted for clarity purposes.
Figure 5:
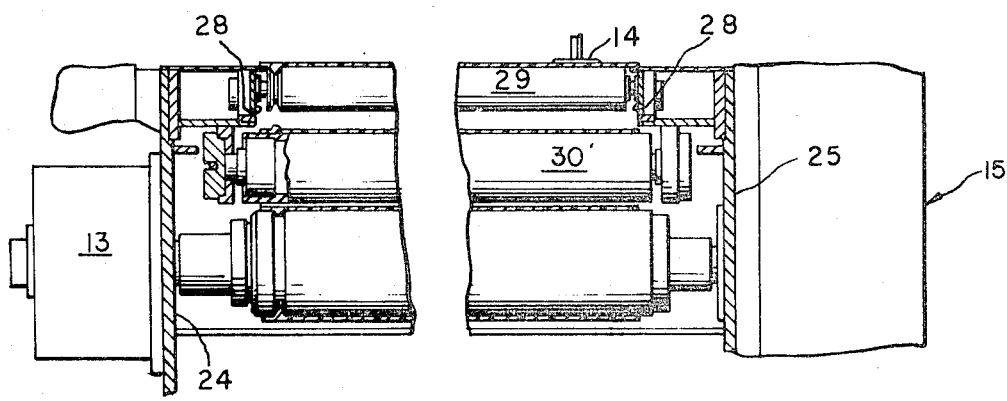
FIGURE 5 is an elevational view, partly in section, showing the relationship of various rollers for supporting one of the endless bands and the driving connection thereto.

Referring to the drawings and particularly FIGURE 1, there is shown a material cutting machine utilizing the closure structure of the present invention. The cutting machine is of the type shown and described in the aforesaid Sederberg application and includes a pair of endless bands 10 and 11 on which material 12 is supported. The bands 10 and 11 are driven in unison by a hydraulic motor within a housing 13 (see FIGURE 5) to move the material 12 as more particularly shown and described in the aforesaid Sederberg application. The material 12 may be a plurality of layers of cloth, for example.

A cutting blade 14 is supported from a fixed bridge 15 by a support 16. As more particularly shown and described in the aforesaid Sederberg application, the support 16 is adapted to be moved transversely on the bridge 15 whereby the cutting blade 14 moves transversely through a transverse passage 17, which is formed between the adjacent ends of the endless bands 10 and 11. The support 16 also is adapted to rotate the cutting blade 14 about a vertical axis as more particularly shown and described in the aforesaid Sederberg application. The support 16 has an electric motor 18 supported thereon to reciprocate the cutting blade 14.

The movement of the cutting blade 14 in the transverse passage 17, the longitudinal movement of the material 12 relative to the cutting blade 14 by the endless bands 10 and 11, and rotation of the cutting blade 14 about a vertical axis are controlled through a numerical control apparatus 19 as more particularly described in the aforesaid Sederberg application. The cutting blade 14 may have any configuration such as those shown in the aforesaid Sederberg application, for example.

Figure 2:
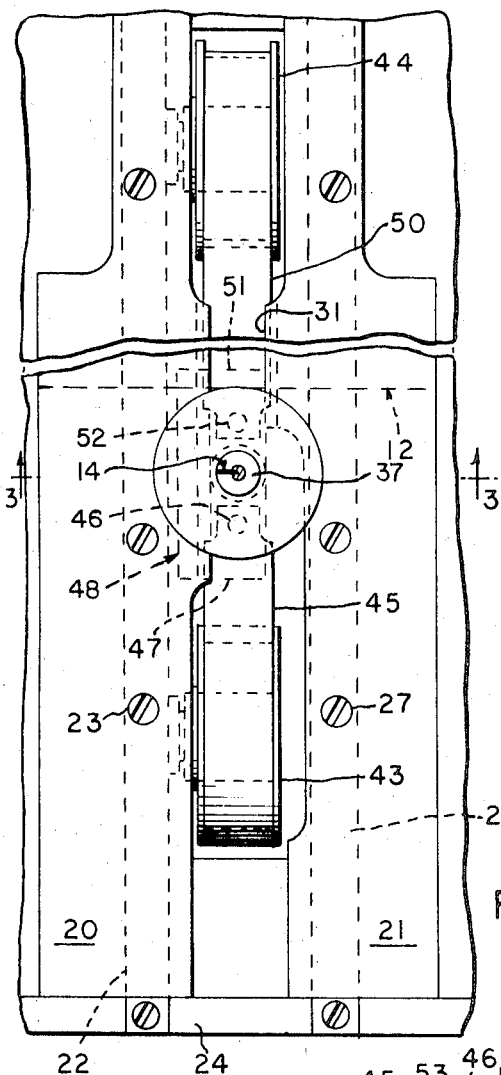
FIGURE 2 is a top plan view of the closure structure of the present invention closing the transverse passage between two endless material support bands of the material cutting machine.
Figure 3:
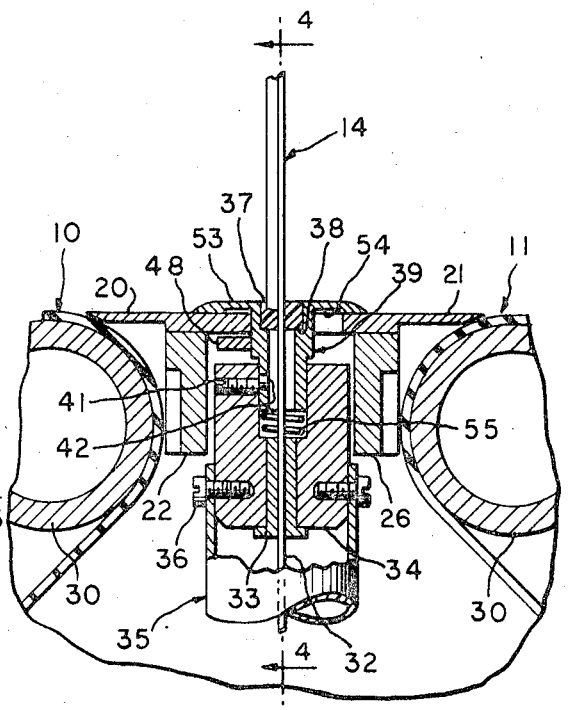
FIGURE 3 is a sectional view of the structure of FIGURE 2 and taken along line 3—3 of FIGURE 2.

As shown in FIGURES 2 and 3, the width of the transverse passage 17 is substantially reduced by a pair of throat way sections 20 and 21. The throat way section 20 is supported on a transverse beam 22 and fixedly secured thereto by suitable means such as screws 23. The transverse beam 22 extends between parallel side plates 24 and 25 (see FIGURE 5) of a table structure, which supports the endless bands 10 and 11, and is supported only at its ends by the side plates 24 and 25.

The throat way section 21 is supported on a transverse beam 26 and fixedly attached thereto by suitable means such as screws 27. The transverse beam 26 extends between the parallel side plates 24 and 25 of the table structure for the endless bands 10 and 11 and is supported only at its ends by the side plates 24 and 25.

The side plates 24 and 25 are supported on a box-like structure, which supports the bridge 15 and parallel side rails 28 of the table structure on which support rollers 29, horizontally spaced guide rollers 30, and take-up rollers 30' for the endless bands 10 and 11 are rotatably supported as more particularly described in the aforesaid Sederberg application. The side rails 28 extend in both longitudinal directions away from the bridge 15.

Each of the throat way sections 20 and 21 is beveled (see FIGURE 3) adjacent the portion of the endless bands 10 and 11 with which it cooperates. The top surface of each of the throat way sections 20 and 21 is disposed slightly below the surface of the endless bands 10 and 11 on which the material 12 rides. This difference is approximately .015".

The throat way sections 20 and 21 are horizontally spaced from each other to provide a transverse gap 31 (see FIGURE 2) therebetween to receive support structure for the cutting blade 14 to permit the cutting blade 14 to move transversely relative to the width of the endless bands 10 and 11 and rotate relative thereto. This insures that the cutting blade 14 may not only traverse the entire width of the material 12, which is supported on the endless bands 10 and 11, but also is capable of rotating relative thereto.

The lower end of the cutting blade 14 has a stiffening rod 32 secured thereto as more particularly shown and described in the aforesaid Sederberg application. The stiffening rod 32 is supported within a bushing 33, which is secured to a support block 34 by suitable means such as a set screw (not shown). The support block 34 is attached to a cylindrical member 35, which is carried by the lower saddle of the support structure of the cutting blade 14 as more particularly shown and described in the aforesaid Sederberg application, by suitable means such as screws 36. Thus, the stiffening rod 32 serves as a guide to insure that the cutting blade 14 moves in its reciprocating plane.

The lower end of the cutting blade 14 is disposed within a cylindrical insert 37, which is preferably formed of a plastic material such as Teflon. The insert 37 rests on an annular shoulder 38 of a sleeve 39. The insert 37, which is retained within the sleeve 39 by a press fit, has a bore therein to permit passage of the stiffening rod 32 therethrough.

The reciprocating motion of the cutting blade 14 forms a recess within the insert 37 to receive the lower end of the cutting blade 14 when the blade 14 is in its lowermost position. It should be understood that the cutting blade 14 has its edge, which is connected to the bottom ends of the leading and trailing edges of the cutting blade 14, sharpened as well as the leading edge in the same manner as shown and described in the aforesaid Sederberg application.

The sleeve 39 is secured to the support block 34 through a screw 41 in the support block 34 extending into a longitudinal slot 42 in the sleeve 39 (see FIGURE 3). This connection insures that the sleeve 39 rotates with the support block 34 and the cylindrical member 35 to insure that the blade 14 also rotates. This slot arrangement permits the sleeve 39 to move vertically relative to the support block 34.

The transverse gap 31, which is formed between the throat way sections 20 and 21, must have a width sufficient to accommodate not only the cutting blade 14 but also the insert 37 and the sleeve 39. Thus, the width of the gap 31 is such that the material 12 may enter therein when an edge of the material 12 passes thereover whereby the material 12 could not be longitudinally advanced between the endless bands 10 and 11.

The structure for closing the gap 31 includes a pair of drums 43 and 44, which are disposed at opposite sides of the endless bands 10 and 11 in areas beyond the maximum width of the material 12. The maximum width of the material 12 is indicated by the phantom line in FIGURE 2. Each of the drums 43 and 44 is rotatably supported by its shaft only on the transverse beam 22. If desired, the drums 43 and 44 could be supported only by the transverse beam 26 or by both of the beams 22 and 26.

A spring tape 45 has one end attached to the drum 43 and its other end attached by a pin 46 to a leg 47 of a U-shaped member 48, which has the sleeve 39 rotatably journaled therein to permit the sleeve 39 to rotate relative to the U-shaped member 48 while moving the U-shaped member 48 transversely with the sleeve 39. The spring tape 45 is constantly biased or urged to be wound upon the drum 43. One suitable example of the spring tape 45 is a coiled metal band sold under the trademark Neg 'ator by Hunter Spring, a Division of Ametek, Inc. The band resists uncoiling with a force that does not increase with linear displacement.

Of course, any other suitable type of tape could be employed. For example, the drum 43 could have a spring wound around its shaft and continuously urging rotation of the drum 43 in a direction to wind the tape 45 thereon.

A spring tape 50 has one end wound around the drum 44 and its other end attached to a leg 51 of the U-shaped member 48 by a pin 52. The spring tape 50 is preferably the same material as the spring tape 45 and is continuously urged to be wound upon the drum 44.

Thus, the spring tapes 45 and 50 cooperate to exert equal and oposite forces on the sleeve 39. This insures that the cutting blade 14 is moved transversely only by its own moving structure and not due to any force of the tapes 45 and 50.

The spring bias of the tapes 45 and 50 insures that one of the tapes 45 and 50 is wound upon its drum while the other of the tapes 45 and 50 is unwound from its drum during movement of the cutting blade 14 in one direction through the transverse passage 17. The opposite result occurs when the cutting blade 14 moves in the opposite direction.

For example, in FIGURE 2, the cutting blade 14 is shown at substantially its completion of travel beyond the side (shown in phantom) of the material 12 that is adjacent the drum 43. As the cutting blade 14 moves away from the drum 43, the tape 45 uncoils from the drum 43 while the tape 50 is wound on the drum 44.

The length of each of the tapes 45 and 50 is such that each of the tapes may extend for substantially the entire length of the transverse gap 31. As shown in FIGURE 2, the width of each of the spring tapes 45 and 50 is sufficient to completely close the transverse gap 31. Each of the tapes 45 and 50 lies slightly beneath overhanging lips of the throat way sections 20 and 21.

Figure 4:
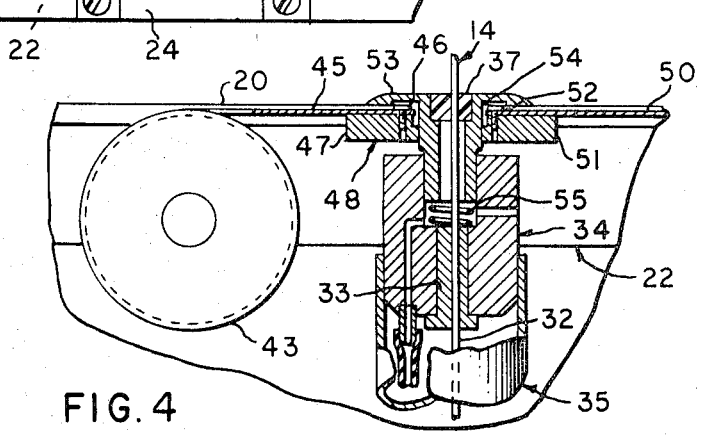
FIGURE 4 is a sectional view of a portion of the structure of FIGURE 2 and taken along line 4—4 of FIGURE 3.

The upper end of the sleeve 39 has an annular flange 53, which is disposed over the pins 46 and 52 (see FIGURE 4). The flange 53 has an annular recess 54 therein to receive the pins 46 and 52.

The lower surface of the annular flange 53 is constantly urged into engagement with the top surface of the throat way sections 20 and 21 by suitable means such as a spring 55, which is connected to the sleeve 39 and the cylindrical member 35 as shown in FIGURES 3 and 4. Thus, any bowing or sagging of the throat way sections 20 and 21 is automatically compensated for through the spring 55.

Since the transverse beams 22 and 26 are only supported at their opposite ends and have the throat way sections 20 and 21 supported thereon, this weight may tend to cause a bowing of the throat way sections 20 and 21. Thus, the spring arrangement compensates for this. This vertical movement of the sleeve 39 by the spring 55 is permitted through the longitudinal slot 42 allowing relative movement in a vertical direction of the sleeve 39 with respect to the support block 34.

As shown in FIGURES 3 and 4, the annular flange 53 is beveled along its outer surface. This permits easy movement of the material 12 from the throat way sections 20 and 21 to the annular flange 53 without the longitudinal movement of the material 12 being retarded.

With the utilization of the annular flange 53, the only opening is a slight opening in the insert 37 into which the lower end of the cutting blade 14 is received during reciprocation. Accordingly, as the material 12 is advanced longitudinally with respect to the cutting blade 14, longitudinal movement of the material 12 is not retarded since only the small opening for the cutting blade 14 is presented to catch the material. This has such a slight width (see FIGURE 2) as to not retard the movement of the material 12.

Considering the operation of the material cutting machine with the closure structure of the present invention, the cutting blade 14 is easily moved through the transverse passage 17 without any gap or passage being presented to retard longitudinal movement of the material 12. Thus, as the cutting blade 14 moves transversely in one direction, one of the tapes 45 and 50 is wound upon its drum while the other of the tapes 45 and 50 is pulled from its drum. When the cutting blade 14 is moved in the opposite direction, the other of the tapes 45 and 50 is pulled from its drum while the one of the tapes 45 and 50 is now wound upon its drum.

Because the small opening in the insert 37 through which the cutting blade 14 including the stiffening rod 32 moves is the only opening in the material supporting means, the material 12 is maintained substantially perpendicular to the cutting blade 14 when it is cut by the cutting blade 14 since the flat top surface of the flange 53 is disposed substantially perpendicular to the cutting blade 14. This insures that the desired pattern is formed in each of a plurality of layers of cloth, for example.

While the closure structure of this invetion has been described as being utilized with the material cutting machine of the aforesaid Sederberg application, it should be understocd that it may be readily employed with a material cutting machine of the type disclosed in the aforesaid Wiatt et al. patent. In this arrangement, the rotatable drums 43 and 44 would be supported on the carriage, which moves longitudinally relative to the frame.

An advantage of this invention is that it insures that material may advance across a transverse passage between portions of the material supporting structure of a material cutting machine without being snagged. Another advantage of this invention is that it provides a substantially continuous material support structure.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. In a cutting machine having cutting means; means to support said cutting means; means to support material to be cut by said cutting means; said material supporting means having a transverse passage therein to receive said cutting means; said material supporting means and said cutting means being relatively movable in a longitudinal direction to move one of the material on said material supporting means and said cutting means relative to the other in a longitudinal direction; said cutting means and said material supporting means being relatively movable in a transverse direction in coordination with the relative longitudinal movement to move one of the material and said cutting means relative to the other in a transverse direction; the improvement comprising:

means to substantially close said transverse passage in said material supporting means;

said closing means having means to maintain an opening to receive said cutting means;

said opening being substantially the same size as said cutting means to prevent material from being caught in said opening; and said maintaining means maintaining said opening in alignment with said cutting means irrespective of the position of said cutting means in said transverse passage.

2. In a cutting machine having cutting means, means to support said cutting means; means to support material to be cut by said cutting means; said material supporting means having a transverse passage therein to receive said cutting means; said material supporting means and said cutting means being relatively movable in a longitudinal direction to move one of the material on said material supporting means and said cutting means relative to the other in a longitudinal direction; said cutting means and said material supporting means being relatively movable in a transverse direction in coordination with the relative longitudinal movement to move one of the material and said cutting means relative to the other in a transverse direction; the improvement comprising:

means to substantially close said transverse passage in said material supporting means;

and said closing means having means to maintain an opening to receive said cutting means;

said closing means comprises:

means to cooperate with said material supporting means to reduce the width of said transverse passage to a transverse gap;

rotatably mounted means disposed on each side of said material supporting means adjacent said transverse passage and disposed in fixed relation to said material supporting means;

one of said rotatably mounted means having one end of a first tape attached thereto, said first tape having a greater width than said transverse gap and being biased toward said one rotatably mounted means;

the other of said rotatably mounted means having one end of a second tape attached thereto, said second tape having a greater width than said transverse gap and being biased toward said other rotatably mounted means; and means to secure the other end of each of said tapes to said support means for said cutting means.

3. The improvement according to claim 2 in which:

said opening maintaining means of said closing means includes means carried by said supoprt means of said cutting means and overlying said tape securing means, said carried means being wider than said gap.

4. The improvement according to claim 3 in which:

said carried means is disposed above said cooperating means of said closing means; and means to continuously urge said carried means into engagement with said cooperating means.

5. A device for substantially closing a transverse gap in a material supporting means into which cutting means extends to cut material supported on the material supporting means, said device including:

rotatable support means disposed adjacent each end of the transverse gap;

one of said rotatable support means having one end of a first closing means attached thereto;

said first closing means having a width sufficient to close the transverse gap and its other end adapted to be fixedly attached to support means for the cutting means to close the transverse gap between said one rotatable support means and the attachment of said first closing means to the support means for the cutting means, said first closing means being resiliently urged toward said one rotatable support means;

the other of said rotatable support means having one end of a second closing means attached thereto; and said second closing means having a width sufficient to close said transverse gap and its other end adapted to be fixedly attached to the support means for the cutting means opposite from the attachment of said first closing means to close the transverse gap between said other rotatable support means and the attachment of said second closing means to the support means for the cutting means, said second closing means being resiliently urged toward said other rotatable support means.

6. The device according to claim 5 in which each of said first closing means and said second closing means is a spring tape.

7. The device according to claim 5 including:

means adapted to be carried by the support means for the cutting means and overlying the connections of said first and second closing means to the support means for the cutting means, said carried means being wider than said gap; and said carried means having an opening therein to receive the cutting means.

8. In a cutting machine having cutting means; means to support said cutting means; means to support material to be cut by said cutting means; said material supporting means having a transverse passage therein to receive said cutting means; said material supporting means and said cutting means being relatively movable in a longitudinal direction to move one of the material on said material supporting means and said cutting means relative to the other in a longitudinal direction; said cutting means and said material supporting means being relatively movable in a transverse direction in coordination with the relative longitudinal movement to move one of the material and said cutting means relative to the other in a transverse direction; the improvement comprising:

means to close said transverse passage in said material supporting means in at least the portion of said transverse passage across which there is relative movement between the material being cut and said transverse passage; and said closing means having means to maintain an opening to receive said cutting means.

9. The improvement according to claim 8 in which:

said closing means comprises first means to cooperate with said material supporting means to reduce the width of said transverse passage to a transverse gap; and second means cooperating with said first cooperating means to close said gap.

10. The improvement according to claim 9 in which said second cooperating means includes:

first movable means disposed on one side of said opening maintaining means;

and second movable means disposed on the opposite side of said opening maintaining means;

said first and second movable means being movable in response to movements of said cutting means through said transverse passage to maintain said gap closed.

References Cited

UNITED STATES PATENTS

| 2,278,032 | 3/1942 | Youngman | 83—271 |
| 3,262,348 | 7/1966 | Wiatt et al. | 83—155 |
| 3,347,121 | 10/1967 | Wiatt | 83—424 X |
| 3,354,765 | 11/1967 | Frey et al. | 83—71 |

FRANK T. YOST, Primary Examiner

U.S. Cl. X.R.

83—427, 428